US010757122B2

(12) United States Patent
Vasudevan et al.

(10) Patent No.: US 10,757,122 B2
(45) Date of Patent: Aug. 25, 2020

(54) USER BEHAVIOR ANOMALY DETECTION

(71) Applicant: Paladion Networks Private Limited, Reston, VA (US)

(72) Inventors: Vinod Vasudevan, Fairfax, VA (US); Rajat Mohanty, Fairfax, VA (US); Harshvardhan Parmar, Herndon, VA (US)

(73) Assignee: PALADION NETWORKS PRIVATE LIMITED, Reston, VA (US)

( * ) Notice: Subject to any disclaimer, the term of this patent is extended or adjusted under 35 U.S.C. 154(b) by 240 days.

(21) Appl. No.: 15/896,126

(22) Filed: Feb. 14, 2018

(65) Prior Publication Data
US 2019/0253443 A1    Aug. 15, 2019

(51) Int. Cl.
*H04L 29/06*  (2006.01)
*G06F 21/55*  (2013.01)
*H04L 29/08*  (2006.01)

(52) U.S. Cl.
CPC ........ *H04L 63/1425* (2013.01); *G06F 21/552* (2013.01); *H04L 63/10* (2013.01); *H04L 63/20* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 6,519,571 B1* | 2/2003 | Guheen | ................... | G06Q 30/02 705/14.66 |
| 7,472,422 B1* | 12/2008 | Agbabian | ................ | H04L 41/06 726/25 |
| 8,185,955 B2* | 5/2012 | Cangini | ................. | G06F 21/554 726/23 |
| 8,443,443 B2* | 5/2013 | Nordstrom | ............ | G06F 21/316 726/23 |
| 9,609,010 B2* | 3/2017 | Sipple | ................. | H04L 63/1425 |
| 2007/0028291 A1* | 2/2007 | Brennan | ................. | H04L 63/20 726/1 |

(Continued)

OTHER PUBLICATIONS

Mehnaz, Shagufta; Bertino, Elisa. Building robust temporal user profiles for anomaly detection in file system accesses. 2016 14th Annual Conference on Privacy, Security and Trust (PST). https://ieeexplore.ieee.org/stamp/stamp.jsp?tp=&arnumber=7906928 (Year: 2016).*

(Continued)

*Primary Examiner* — Jeremiah L Avery
(74) *Attorney, Agent, or Firm* — Schott, P.C.

(57) ABSTRACT

A network user behavior system that detects anomalous user behavior includes a memory system with a user behavior module. The user behavior module creates a user profile based on user activity that includes user activity logs that record parameters related to user activity; selects indicator features, wherein the indicator feature includes user activity related to the parameters; creates a user identifier (UID) for each combination of the indicator feature and user; associates each UID with a timestamp to establish a UID and timestamp relationship; establishes a UID and timestamp relationship range indicative of non-anomalous user behavior; and identifies an anomalous user behavior as a UID and timestamp relationship outside of the range indicative of non-anomalous user behavior.

20 Claims, 6 Drawing Sheets

(56) References Cited

U.S. PATENT DOCUMENTS

| | | | | |
|---|---|---|---|---|
| 2007/0028303 | A1* | 2/2007 | Brennan | H04L 63/20 |
| | | | | 726/24 |
| 2007/0087756 | A1* | 4/2007 | Hoffberg | G06Q 30/0201 |
| | | | | 455/450 |
| 2007/0162308 | A1* | 7/2007 | Peters | G06Q 50/22 |
| | | | | 705/2 |
| 2014/0201838 | A1* | 7/2014 | Varsanyi | G06F 21/552 |
| | | | | 726/23 |
| 2015/0379303 | A1* | 12/2015 | LaFever | G06F 21/6254 |
| | | | | 726/28 |
| 2017/0093910 | A1* | 3/2017 | Gukal | H04L 63/1416 |
| 2017/0223046 | A1* | 8/2017 | Singh | H04L 63/1491 |

OTHER PUBLICATIONS

Vaas, Christian; Happa, Jassim. Detecting disguised processes using application-behavior profiling. 2017 IEEE International Symposium on Technologies for Homeland Security (HST). https://ieeexplore.ieee.org/stamp/stamp.jsp?tp=&arnumber=7943508 (Year: 2017).*

Hsiao, Shun-Wen et al. A cooperative botnet profiling and detection in virtualized environment. 2013 IEEE Conference on Communications and Network Security (CNS). https://ieeexplore.ieee.org/stamp/stamp.jsp?tp=&arnumber=6682703 (Year: 2013).*

* cited by examiner

USER BEHAVIOR ANOMALY DETECTION

BACKGROUND

Attackers use malicious software (malware) to attack users and networks. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer. Other forms of attack spoof user interaction while at the same time extracting or encrypting valuable information.

In response to the increasing difficulty of detecting malware and attackers, security software is evolving. Security approaches fall into the categories of prevention (rotating passwords, building stronger firewalls, etc.) and detection, whereby a security system attempts to detect user behavior outside the norm.

The later approach may be seen in web-based email programs, where if a user logs in from a new geography, the user is challenged to provide a password or proceed through a dual authentication protocol. This works in some instances but does not take into account detection when a user's login information has already been compromised and an attacker is inside the system.

SUMMARY OF THE EMBODIMENTS

A network user behavior system that detects anomalous user behavior includes a memory system with a user behavior module. The user behavior module creates a user profile based on user activity that includes user activity logs that record parameters related to user activity; identifies indicator features, wherein the indicator feature includes parameters related to the user activity; creates a unique identifier (UID) for each combination of the indicator feature and user; associates each UID with a timestamp to establish a UID and timestamp relationship; establishes a UID and timestamp relationship range indicative of non-anomalous user behavior; and identifies an anomalous user behavior as a UID and timestamp relationship outside of the range indicative of non-anomalous user behavior.

DETAILED DESCRIPTION OF THE EMBODIMENTS

Introduction

Figure 1A:
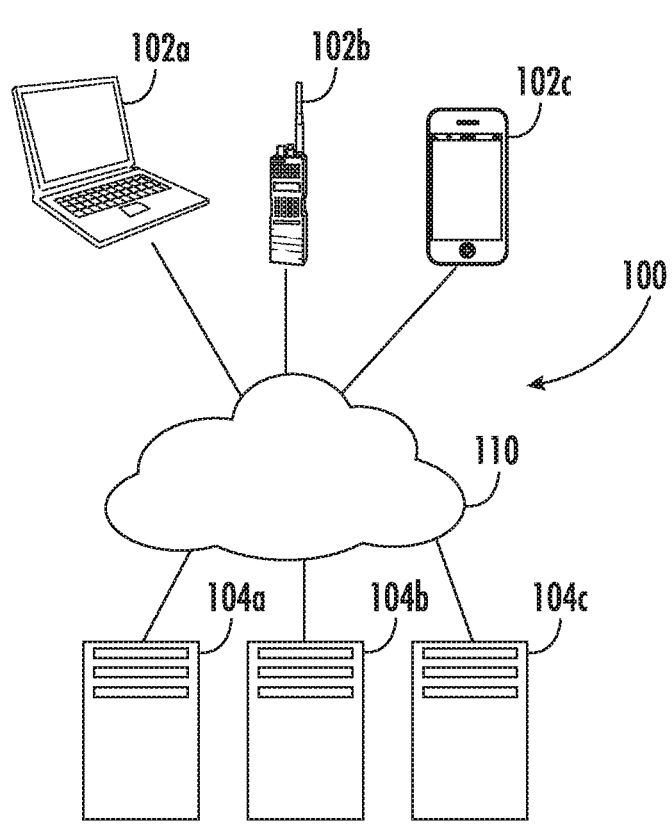
FIG. 1A shows an embodiment of a network environment.

The system and method of improving network security described herein may be implemented using system and hardware elements shown and described herein. For example, FIG. 1A shows an embodiment of a network 100 with one or more clients 102a, 102b, 102c that may be local machines, personal computers, mobile devices, servers, tablets that communicate through one or more networks 110 with servers 104a, 104b, 104c. It should be appreciated that a client 102a-102c may serve as a client seeking access to resources provided by a server and/or as a server providing access to other clients.

The network 110 may be wired or wireless links. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way and are thus depicted as shown in FIG. 1A as a cloud.

The network 110 may be located across many geographies and may have a topology organized as point-to-point, bus, star, ring, mesh, or tree. The network 110 may be an overlay network which is virtual and sits on top of one or more layers of other networks.

In most cases, every device on a network has a unique identifier. In the TCP/IP protocol, the unique identifier for a computer is an IP address. An IPv4 address uses 32 binary bits to create a single unique address on the network. An IPv4 address is expressed by four numbers separated by dots. Each number is the decimal (base-10) representation for an eight-digit binary (base-2) number, also called an octet. An IPv6 address uses 128 binary bits to create a single unique address on the network. An IPv6 address is expressed by eight groups of hexadecimal (base-16) numbers separated by colons.

An IP address can be either dynamic or static. A static address remains constant for a system unless modified by a user. Dynamic addresses are assigned by the Dynamic Host Configuration Protocol (DHCP), a service running on the network. DHCP typically runs on network hardware such as routers or dedicated DHCP servers.

Dynamic IP addresses are issued using a leasing system, meaning that the IP address is only active for a limited time. If the lease expires, the computer will automatically request a new lease. Sometimes, this means the computer will get a new IP address, too, especially if the computer was unplugged from the network between leases. This process is usually transparent to the user unless the computer warns about an IP address conflict on the network (two computers with the same IP address).

Another identifier for a device is the hostname. A hostname is a human-readable label assigned to a device and can be modified by a user. Hostname can be resolved to the IP address of the device. This makes hostname a more reliable device identifier in a network with dynamic IP addresses.

Information in the IP Address may be used to identify devices, geographies, and networks. The hostname may be used to identify devices.

A system may include multiple servers 104a-c stored in high-density rack systems. If the servers are part of a common network, they do not need to be physically near one another but instead may be connected by a wide-area network (WAN) connection or similar connection.

Management of group of networked servers may be de-centralized. For example, one or more servers 104a-c may include modules to support one or more management services for networked servers including management of dynamic data, such as techniques for handling failover, data replication, and increasing the networked server's performance.

The servers 104a-c may be file servers, application servers, web servers, proxy servers, network appliances, gateways, gateway servers, virtualization servers, deployment servers, SSL VPN servers, or firewalls.

When the network 110 is in a cloud environment, the cloud network 110 may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications. A common example of a SaaS application is SALESFORCE or web-based email.

A client 102a-c may access IaaS, PaaS, or SaaS resources using preset standards and the clients 102a-c may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1B:
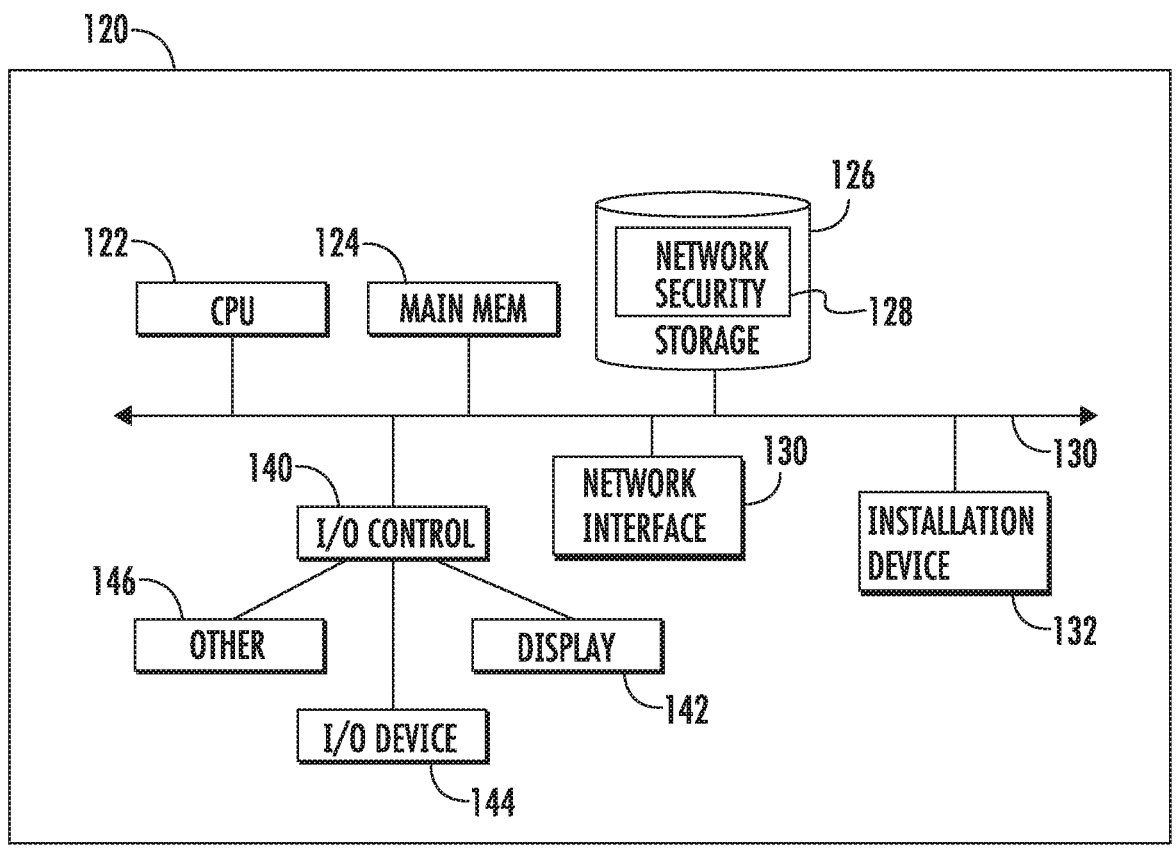
FIG. 1B shows block diagrams of a computing device.

The clients 102a-c and servers 104a-c may be embodied in a computer, network device or appliance capable of communicating with a network and performing the actions herein. FIGS. 1A and 1B show block diagrams of a computing device 120 that may embody the client or server discussed herein. The device 120 may include a system bus 150 that connects the major components of a computer system, combining the functions of a data bus to carry information, an address bus to determine where it should be sent, and a control bus to determine its operation. The device includes a central processing unit 122, a main memory 124, and storage device 124. The device 120 may further include a network interface 130, an installation device 132 and an I/O control 140 connected to one or more display devices 142, I/O devices 144, or other devices 146 like mice and keyboards.

The storage device 126 may include an operating system, software, and a network user behavior module 128, in which may reside the network user behavior system and method described in more detail below.

The computing device 120 may include a memory port, a bridge, one or more input/output devices, and a cache memory in communication with the central processing unit.

The central processing unit 122 may be a logic circuitry such as a microprocessor that responds to and processes instructions fetched from the main memory 124. The CPU 122 may use instruction level parallelism, thread level parallelism, different levels of cache, and multi-core processors. A multi-core processor may include two or more processing units on a single computing component.

The main memory 124 may include one or more memory chips capable of storing data and allowing any storage location to be directly accessed by the CPU 122. The main memory unit 124 may be volatile and faster than storage memory 126. Main memory units 124 may be dynamic random access memory (DRAM) or any variants, including static random access memory (SRAM). The main memory 124 or the storage 126 may be non-volatile.

The CPU 122 may communicate directly with a cache memory via a secondary bus, sometimes referred to as a backside bus. In other embodiments, the CPU 122 may communicate with cache memory using the system bus 150. Cache memory typically has a faster response time than main memory 124 and is typically provided by SRAM or similar RAM memory.

Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices 142 may be connected to the I/O controller 140. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays.

The computing device 120 may include a network interface 130 to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols. The computing device 120 may communicate with other computing devices via any type and/or form of gateway or tunneling protocol such as Secure Socket Layer (SSL) or Transport Layer Security (TLS). The network interface 130 may include a built-in network adapter, network interface card, PCMCIA network card, EXPRESSCARD network card, card bus network adapter, wireless network adapter, USB network adapter, modem or any other device suitable for interfacing the computing device 120 to any type of network capable of communication and performing the operations described herein.

The computing device 120 may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 120 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

The status of one or more machines 102a-c, 104a-c may be monitored, generally, as part of network management. In one of these embodiments, the status of a machine may include an identification of load information (the number of processes on the machine, CPU and memory utilization), of port information (the number of available communication ports and the port addresses), session status (the duration and type of processes, and whether a process is active or idle), or as mentioned below. In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
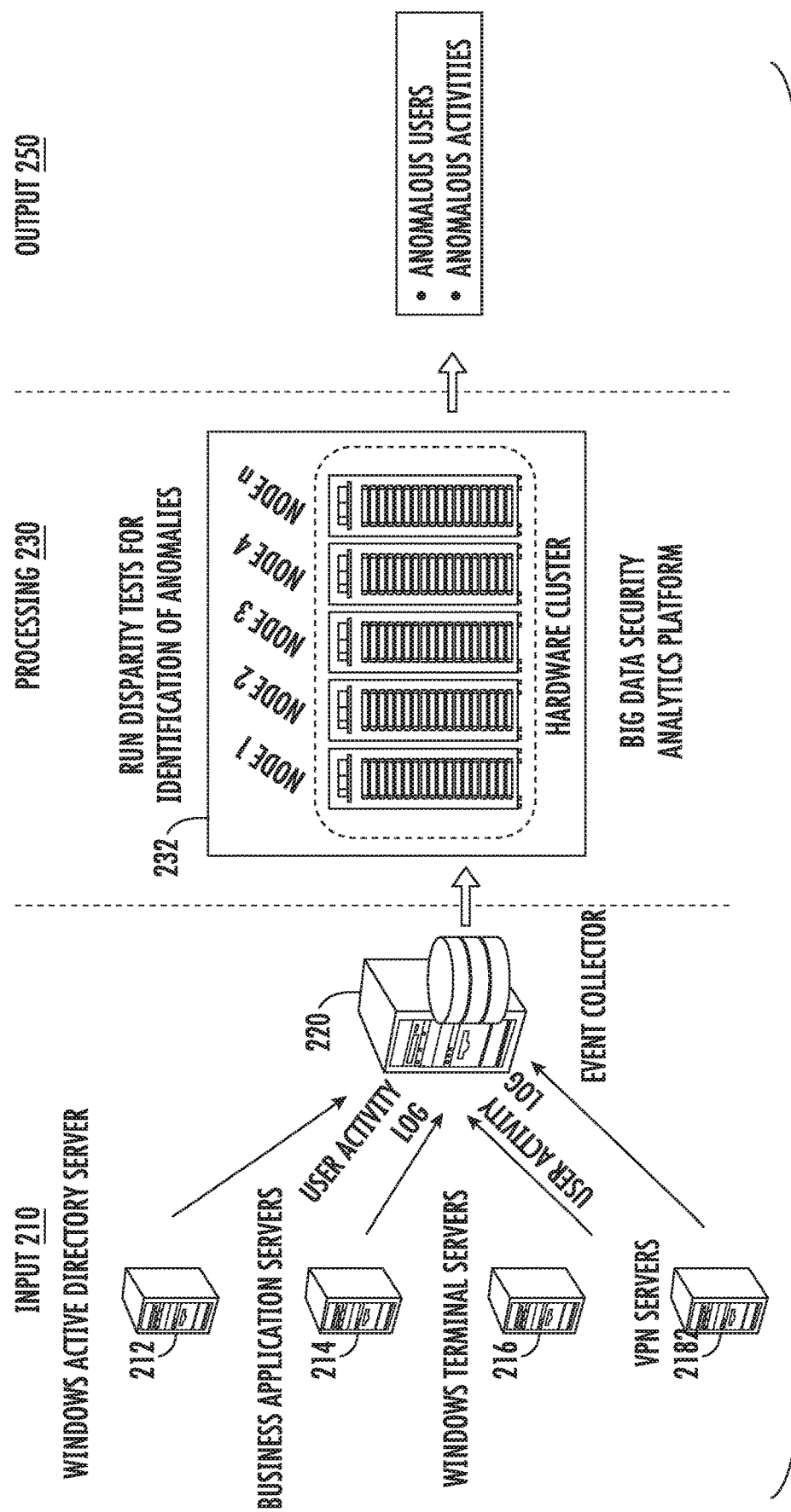
FIG. 2 shows an embodiment of the invention in a network environment.

FIG. 2 shows a specific environment 200 in which the system and method may be used in which there is input 210, processing 230 and output 250. The input may include input that includes user behavioral parameters from sources such as windows active directory servers 212, business application servers 214, terminal servers 216, and/or VPN servers 218. Some or all of these may report user activity logs including certain parameters to an event collector server or device 220. The event collector 220 aggregates the user activity logs as input and sends them to an analytics platform 232 for processing described in detail below. Following the processing, the analytics platform 232 transmits output 250 in the form of reports or other actions that identify and act on anomalous users and activities.

Anomaly Detection Processing

This system described herein identifies anomalies in a user's activity pattern in an organization's network over a period of time. The anomaly information can be used to identify suspicious user activity that could be the result of malware infection, outside attack on the system, or compromised accounts.

This system, which may be embodied in a server 104a-c, network 110, device 102a-c but most likely an event collector 220 and an analytics platform 232 as shown in FIG. 2, may profile various types of user activity to detect deviations in activity patterns from a baseline it identifies as normal. The system collects user activity events from multiple sources 212, 214, 216, 218 using a central collector system 220. The system makes use of a multi-node, big data cluster to store and process the user activity events. The system prepares data followed by creation of user profiles associated with user activity on the network and detection of anomalies in the profile. The user profiles include user activity logs that track parameters including user location, access time, access duration, application interaction, data type downloaded, data amount downloaded and other types of user data. The user activity logs may also include time stamps, system identifiers, event identifiers and activity details. User details and time are features for creating the profiles. From the rest of the features, relevant features are identified based on the expected outcome from the profiling activity.

The data preparation step includes the steps of: identifying the right parameters from user activity logs, feature engineering (engineering new parameters based on existing ones while maintaining relevance to the domain involved), identifying the users and/or the activities that qualify for profiling and creating user profiles. Once the system creates the user profiles, the system can apply anomaly detection mechanism for detecting deviations in user behavior.

In use, if the objective of profiling is to identify deviations in the type of activities performed by the user, selected features should provide information about the individual user's activity. If the objective is to identify deviations in the systems being used for performing the activities, system information may be included.

Feature engineering needs to be performed for the activity logs once the feature list has been finalized. The objective of feature engineering is to combine the selected features into a single indicator feature that can be used to generate a time series of the user activities. For this purpose, distinct combinations of the user name and all selected features, except time stamps, may be identified from the activity log and the system may assign a unique ID (UID) to each distinct combination.

Example

For user activity on a system, a typical UID will be a combination of user name, system hostname, process name and event type where user name is the name or login identifier for a specific user, system hostname identifies the host, process name identifies a process (or processes) being run, and event type specifies the user activity being performed.

For user activity on a network, the system will may form a UID from a combination of User name, Source IP address, Destination IP address, and Process name.

The resultant data-set will have two columns—the UID and the time stamp. This establishes a UID and timestamp relationship.

TABLE 1

Sample data-set with UID and time stamp

| UID | Timestamp |
| --- | --- |
| P00001 | 10:03:21 |
| P00002 | 10:04:55 |
| P00001 | 10:05:17 |
| P00001 | 10:07:22 |
| P00003 | 10:06:01 |

TABLE 1-continued

Sample data-set with UID and time stamp

| UID | Timestamp |
|---|---|
| P00003 | 10:06:44 |
| P00002 | 10:08:02 |

From the resultant data-set, an additional data-set may be created containing cumulative occurrence count for every UID.

TABLE 2

Sample table for occurrence count

| UID | Occurrence count |
|---|---|
| P00001 | 3 |
| P00002 | 2 |
| P00003 | 2 |

With this information, the system may establish a UID and timestamp range indicative of non-anomalous user behavior. The system may identify and segregate the low frequency user activities from high frequency activities. All UIDs having occurrence count below a pre-determined frequency threshold may be ignored, as potentially not meaningful in a continuous analysis. The frequency threshold for identifying low frequency user activity can be decided based on:

The type of user activity, and
The time duration being considered for profiling.

Upon detection of anomalous behavior, the system will generate an alert indicating the user identified. Based on the alert, one may block further user activity, alert relevant authorities, prevent access to certain servers, files, or other valuable data.

Example

For profiling an activity over a period of 30 days, a frequency threshold count of 30 can be potentially used as a frequency of less than 30 in 30 days indicates that the activity was observed on an average of less than once a day. All user activity above the frequency threshold may be broadly classified into three profiles:

User activity that is highly concentrated (profile A),
User activity that is relatively constant throughout the day (profile B), and
User activity that does not fall in either of the above categories (profile C).

Figure 3A:
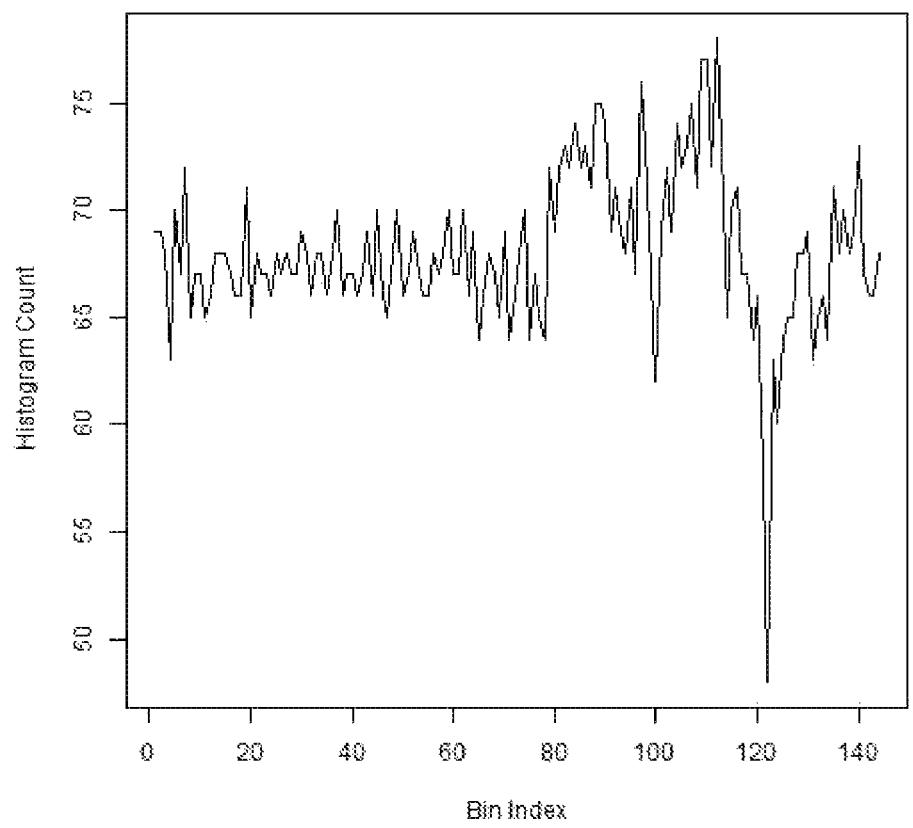
FIGS. 3A-3C show histograms for 3 profiles.
Figure 3B:
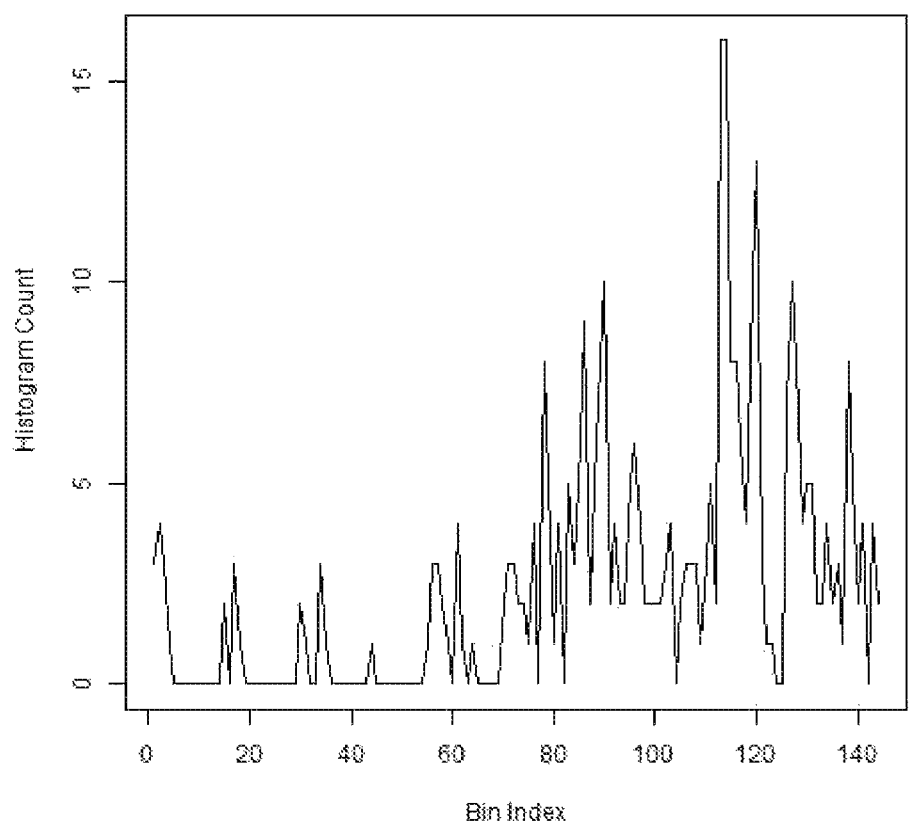
Figure 3C:
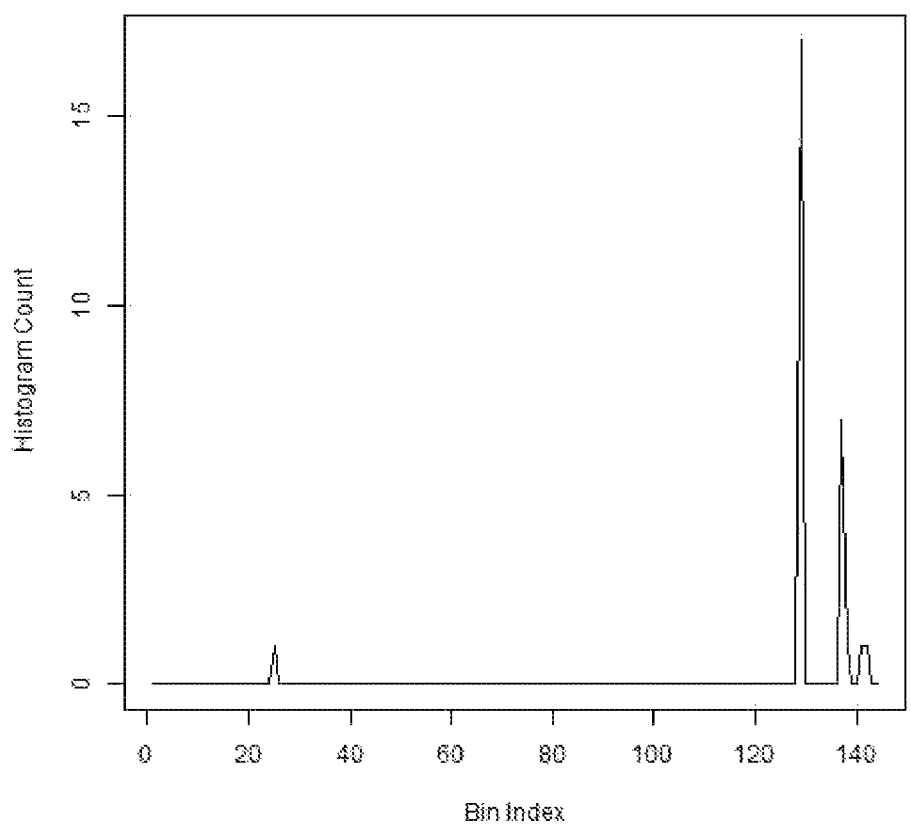

Profile A or Highly concentrated activity may be defined as user activity which consistently occurs within a short, fixed interval of time as shown in FIG. 3B. Profile B or Relatively constant behavior may be defined by user activities evenly spread across longer periods of time as shown in FIG. 3A. Profile C is shown in FIG. 3C. The method may use data driven partitioning methods to enable it to combine multiple user activity profiles such as the three mentioned above.

If the data-set only contains activity matching profile A, the following steps can be performed for detecting anomalies.

Identify an interval threshold (say, Ith) based on the type of user activity.
Identify the first occurrence of the UID and its time stamp, say T0.
With T0 as the starting time, identify the time stamp of the last event observed for this UID in the time interval T0+Ith, say T1.
With T1 as the new starting time, identify the time stamp of the last occurrence of this UID in the interval T1+Ith, say T2.
Perform the previous step recursively until the system identifies a time stamp Tn such that there are no more events found for this UID in the time interval Tn+Ith.
Identify the time boundary values, with the starting value being T0-Ith and the ending time value being Tn+Ith, to determine the time window for normal activity.

A UID can potentially have multiple such time windows in a day.

Compare time stamps of all new occurrences of this UID with the time windows identified. All events observed outside the identified time windows may be treated as anomalous. If an identified event is found to be legitimate, and is not an exceptional occurrence, it can be used to recalculate the time window boundary or identify a new time window. A legitimacy check may include a human intervention to request a user to explain certain activity, or consulting with other data sources (security cameras or other tracking devices) to verify user activity.

If the data-set contains activity matching profile B or C, the following testing methods may be used for detecting anomalies.

Parametric tests may include determining the mean, variance, and higher order moments of user behavior based on historical patterns, and then comparing against the same parameters of potentially anomalous behavior, Nonparametric tests such as the one-parameter K-S (Kolmogorov-Smirnov) test may be used to determine the likelihood that potentially anomalous observed behavior is inconsistent with historically observed pattern of behavior, and the two-parameter K-S test to determine the likelihood that two patterns of behavior, one normal and one potentially anomalous, are inconsistent with each other.

Parametric and nonparametric tests may be combined through methods such as majority polling, weighted majority polling, cross-validation and others, to arrive at more robust and reliable conclusions.

While the invention has been described with reference to the embodiments above, a person of ordinary skill in the art would understand that various changes or modifications may be made thereto without departing from the scope of the claims.

The invention claimed is:

1. A network user behavior system that detects anomalous user behavior comprising:
a memory system comprising a user behavior module, the user behavior module configured to:
create a user profile based on user activity, the user profile comprising user activity logs that record parameters related to user activity;
identify & choose indicator features, wherein the indicator feature includes user activity related to the parameters;
create a single and unique user identifier (UID) for each combination of the indicator feature and user;
associate each UID with a timestamp to establish a UID and timestamp relationship;
establish a UID and timestamp relationship range indicative of non-anomalous user behavior; and
identify an anomalous user behavior as a UID and timestamp relationship outside of the range indicative of non-anomalous user behavior.

2. The network user behavior system user behavior module of claim 1, wherein the UID and timestamp relationship includes an occurrence count of a timestamp over a determined period of time.

3. The network user behavior system of claim 2, wherein the parameters are selected from the group consisting of user name, source IP address, destination IP address, process name, source hostname, destination hostname, email ID, user action, event type, user-agent, referrer, requested URL, requested domain, file path, file type, traffic direction, protocol, destination port, TCP flags, user location, user access time, user access duration, user application interaction, user data type downloaded, and user data amount downloaded.

4. The network user behavior system of claim 2, wherein upon detection of an anomalous user behavior, the system blocks further user activity.

5. The network user behavior system of claim 2, wherein upon detection of an anomalous user behavior, the system prevents user access to files.

6. The network user behavior system of claim 1, wherein the UID and timestamp relationship range indicative of non-anomalous user behavior includes user activity that is concentrated in a time period.

7. The network user behavior system of claim 1, wherein the UID and timestamp relationship range indicative of non-anomalous user behavior includes user activity that is constant throughout a time period.

8. The network user behavior system of claim 1, wherein the identification of user anomalous behavior comprises the use of parametric testing.

9. The network user behavior system of claim 1, wherein the identification of user anomalous behavior comprises the use of nonparametric testing.

10. The network user behavior system of claim 1, wherein the UID and timestamp relationship range indicative of non-anomalous user behavior is established by steps comprising:
   identifying an interval threshold (Ith) based on the type of user activity;
   identifying a first occurrence of the UID and the UID time stamp as T0;
   wherein with T0 as a starting time, identifying the time stamp of a last feature observed for the UID in a time interval T0+Ith (T1);
   establishing T1 as a starting time to identify a time stamp of the last occurrence of the UID in the interval T1+Ith (T2);
   performing the establishing step recursively until the system identifies a time stamp Tn such that there are no more events found for the UID in the time interval Tn+Ith; and
   identifying time boundary values, with a starting value being T0-Ith and an ending time value being Tn+Ith;
   wherein events observed outside the time boundary value are anomalous.

11. A method for detecting anomalous user behavior on a network comprising:
   creating a user profile based on user activity, the user profile comprising user activity logs that record parameters related to user activity;
   identifying and choosing indicator features, wherein the indicator feature includes user activity related to the parameters;
   creating a single and unique user identifier (UID) for each combination of the indicator feature and user;
   associating each UID with a timestamp to establish a UID and timestamp relationship;
   establishing a UID and timestamp relationship range indicative of non-anomalous user behavior; and
   identifying an anomalous user behavior as a UID and timestamp relationship outside of the range indicative of non-anomalous user behavior.

12. The method of claim 11, wherein the UID and timestamp relationship includes an occurrence count of a timestamp over a determined period of time.

13. The method of claim 12, wherein the parameters are selected from the group consisting of user name, source IP address, destination IP address, process name, source hostname, destination hostname, email ID, user action, event type, user-agent, referrer, requested URL, requested domain, file path, file type, traffic direction, protocol, destination port, TCP flags, user location, user access time, user access duration, user application interaction, user data type downloaded, and user data amount downloaded.

14. The method of claim 12, wherein upon detection of an anomalous user behavior, the method blocks further user activity.

15. The method of claim 12, wherein upon detection of an anomalous user behavior, the method prevents user access to files.

16. The method of claim 11, wherein the UID and timestamp relationship range indicative of non-anomalous user behavior includes user activity that is concentrated in a time period.

17. The method of claim 11, wherein the UID and timestamp relationship range indicative of non-anomalous user behavior includes user activity that is constant throughout a time period.

18. The method of claim 11, wherein the identification of user anomalous behavior comprises the use of parametric testing.

19. The method of claim 11, wherein the identification of user anomalous behavior comprises the use of nonparametric testing.

20. The method of claim 11, wherein the UID and timestamp relationship range indicative of non-anomalous user behavior is established by steps comprising:
   identifying an interval threshold (Ith) based on the type of user activity;
   identifying a first occurrence of the UID and the UID time stamp as T0;
   wherein with T0 as a starting time, identifying the time stamp of a last feature observed for the UID in a time interval T0+Ith (T1);
   establishing T1 as a starting time to identify a time stamp of the last occurrence of the UID in the interval T1+Ith (T2);
   performing the establishing step recursively until the system identifies a time stamp Tn such that there are no more events found for the UID in the time interval Tn+Ith; and
   identifying time boundary values, with a starting value being T0-Ith and an ending time value being Tn+Ith;
   wherein events observed outside the time boundary value are anomalous.

* * * * *